May 26, 1970 H. G. SHERMAN 3,513,915
RESILIENTLY FLEXIBLE HORSESHOE
Filed Aug. 13, 1968
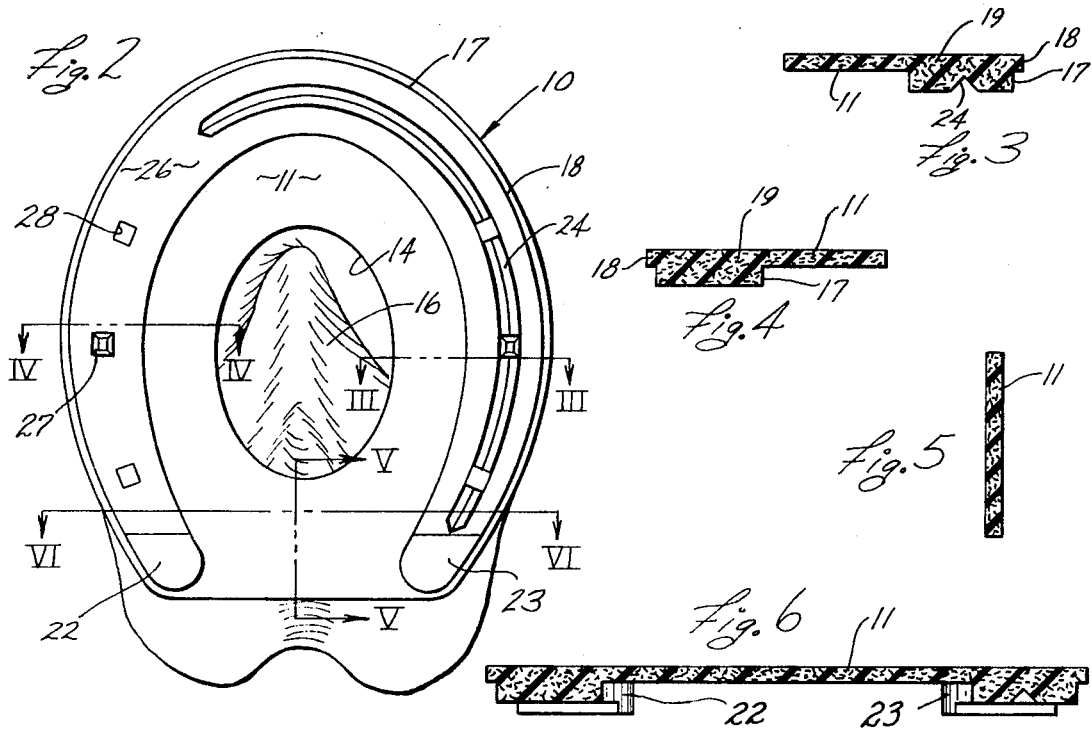
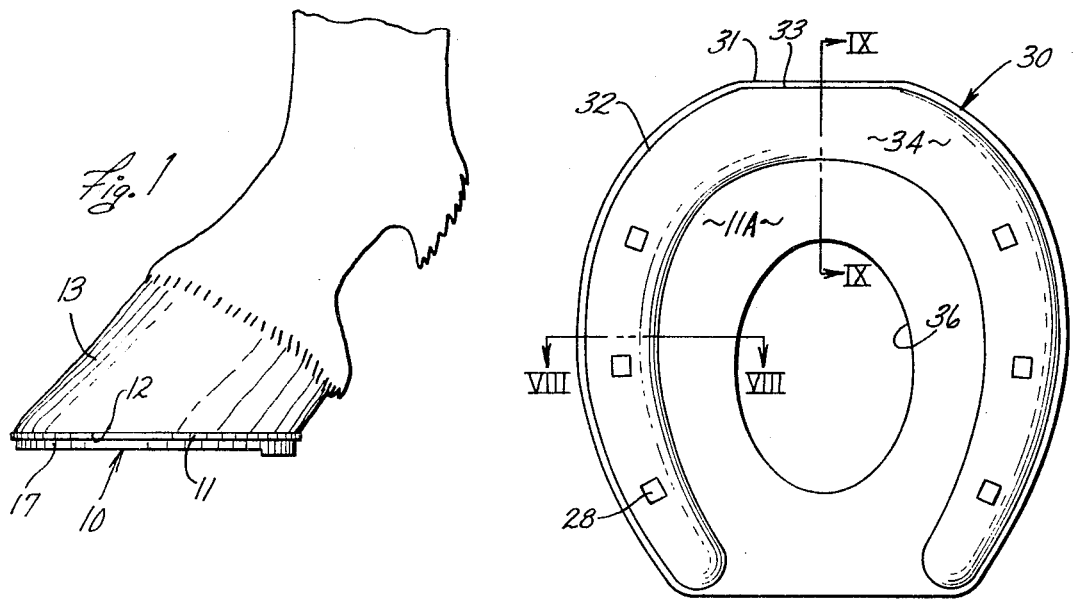
INVENTOR.
HARVEY GEORGE SHERMAN United States Patent Office 3,513,915
Patented May 26, 1970

3,513,915
RESILIENTLY FLEXIBLE HORSESHOE
Harvey George Sherman, 923 Southern Ave.,
Kalamazoo, Mich. 49001
Filed Aug. 13, 1968, Ser. No. 752,343
Int. Cl. A01l 5/00
U.S. Cl. 168—4                                              7 Claims

ABSTRACT OF THE DISCLOSURE

An elastomeric horseshoe impregnated with small metal fragments and comprising a sheet means having a central opening and an arcuate gripping member integral with and extending approximately three-quarters of the way around said sheet means adjacent the outer edge thereof.

BACKGROUND OF THE INVENTION

This invention relates in general to a resiliently flexible horseshoe and, more particularly, to a type thereof which is capable of absorbing severe shocks and avoiding lacerations while, at the same time, providing a satisfactory amount of resistance to wear.

Persons familiar with the handling of horses, and particularly horses used in racing, riding, rodeos, and the like, have long been aware of the need for a better horseshoe. It has been common knowledge among trainers and handlers for many years that the legs of horses, and particularly their ankles, tendons, knees and shoulders, are frequently injured (occasionally permanently) by the shocks incurred from impact of their hoofs with relatively hard surfaces, especially during competition or in preparation for same. The lameness or soreness which develops in a horse's legs often becomes so severe that the legs must be packed in ice for substantial periods of time before the competition or the horse will be unable to perform. Drugs have been developed to reduce the pain but, unfortunately, they are barred at all tracks because they also produce side effects upon the horse which are considered unacceptable to racing.

Another serious problem created by existing horseshoes involves the painful and crippling lacerations often produced in one leg of a horse by the edge of a horseshoe on the hoof of another leg. These injuries have frequently occurred in the quarters, ankles, tendons, elbows and other parts of the legs, and they have been known to cripple a horse permanently.

Some attempts have been made in the past to use resiliently flexible horseshoes, but these attempts have been largely unsuccessful for a variety of reasons. For example, excessive wear, lack of sufficient lateral strength and difficulty to apply the shoes to the hoof are among the reasons why such shoes have previously failed to gain acceptance, much less commercial success.

Accordingly, a primary object of this invention is the provision of a resiliently flexible horseshoe capable of resisting excessive wear, capable of resisting excessive lateral deflections and capable of being easily applied to the hoof of a horse.

A further object of this invention is the provision of a horseshoe, as aforesaid, which can be manufactured easily, which can be supplied in a variety of different sizes and shapes, and which can be quickly adapted to the particular shape of the hoof of any given horse or pony.

Other objects and purposes of this invention will become apparent to persons familiar with this type of device upon reading the following description and examining the accompanying drawings, in which:

FIG. 1 is a side view of the lower portion of a horse's leg with the shoe of the invention attached thereto.

FIG. 2 is a bottom view of said leg appearing in FIG. 1.

FIG. 3 is a sectional view taken along the line III—III in FIG. 2.

FIG. 4 is a sectional view taken along the line IV—IV in FIG. 2.

FIG. 5 is a sectional view taken along the line V—V in FIG. 2.

FIG. 6 is a sectional view taken along the line VI—VI in FIG. 2.

FIG. 7 is a bottom view of a modified horseshoe embodying the invention.

FIG. 8 is a sectional view taken along the line VIII—VIII in FIG. 7.

FIG. 9 is a sectional view taken along the line IX—IX in FIG. 7.

SUMMARY OF THE INVENTION

The objects and purposes of the invention, including those set forth above, have been met by providing a horseshoe structure comprising resiliently flexible sheet means having an edge contour substantially conforming with, but slightly larger than, the bottom of the hoof of a horse to which the shoe is to be applied. An arcuate gripping member, which is flat, relatively wide and thin, is integral with and extends approximately three-quarters of the way around said sheet means near to, but spaced slightly from, the said edge thereof. The sheet means has a central opening spaced radially inwardly from the inner edge of the arcuate gripping member. A plurality of relatively small metal fragments are dispersed substantially uniformly within the gripping member to provide strength and wear resistance.

DETAILED DESCRIPTION

The horseshoe 10 (FIGS. 1 and 2) has an elastomeric pad or sheet means 11 which is preferably in the range of from $\frac{1}{16}$ of an inch to $\frac{1}{8}$ of an inch in thickness, and is preferably fabricated from rubber, either natural or synthetic. The outside edge contour of the pad 11 is such that it will extend slightly, such as $\frac{1}{16}$ to $\frac{1}{8}$ of an inch, beyond the outer edge of the bottom or sole 12 of a horse's hoof 13 therearound. The pad 11 has a central opening 14 through which air can pass to ventilate the frog 16 in the horse's hoof. The tensile strength of the pad 11 is such that it will resist spreading of the buttresses of the horse's hoof in a manner which could otherwise injure the hoof.

An arcuate, relatively flat gripping member 17 is integral with and extends approximately three-quarters of the way around the pad 11 adjacent to, but spaced from, the outer edge thereof, thereby leaving a trim edge 18 for purposes appearing hereinafter. Normally, the trim edge is approximately $\frac{1}{16}$ to $\frac{1}{8}$ of an inch wide. The gripping member 17 is flat, relatively thin and wide. More specifically, its thickness will be in the neighborhood of from $\frac{1}{4}$ to $\frac{3}{8}$ of an inch and its width will be in the neighborhood of from $\frac{1}{2}$ to $\frac{3}{4}$ of an inch, but somewhat larger or smaller dimensions may be desirable under some circumstances.

The gripping member 17 is integral with the pad 11 and is preferably fabricated from the same resiliently flexible rubber, either natural or synthetic, and in the same molding operation, which produces the pad 11.

A plurality of small, metal fragments 19, such as steel filings, are distributed (FIGS. 3 and 4) throughout the gripping element 17, at least, and throughout both the gripping element and the pad 11 when they are molded together from the same material. The metal fragments are uniformly distributed within the rubber to give it both strength and resistance to wear. Nevertheless, the spacing of such fragments is sufficient that it does not in any way inhibit or reduce the normal resiliency of the rubber which is an essential feature of this invention.

In the particular embodiment disclosed in FIGS. 1 and 2, the gripping member may have integral heel caulks 22 and 23 which, in a substantially conventional manner, afford more grip to such member. Also, the gripping member 17 is provided with a half swedge 24 which, as appearing in FIG. 3, is a groove having a V-shaped cross section and extending lengthwise along a substantial portion of said gripping member approximately midway between the lateral edges thereof. The swedge 24, which can be extended into a full swedge if desired, also provides further gripping in the ground-engaging surface 26 of the gripping member 17. Nail openings 27 are provided in the shoe 10 to receive nails 28 for the usual purposes.

FIGS. 7, 8 and 9 illustrate a modified shoe construction 30 including a pad 11A which may be substantially identical with the pad 11, except that it has a square or flat toe 31. A gripping member 32, which may have approximately the same arcuate configuration as the gripping member 17, is integral with the pad 11A and also has a flat toe 33. The lower surface 34 of the gripping member 32 (as shown in FIGS. 8 and 9) has a convex lower surface transversely thereof which is often referred to as a "half-round" surface.

As in the case of horseshoe 10, horseshoe 30 is preferably molded in a single piece and has a central opening 36 in said pad 11A. At least the gripping member 32, and preferably both the gripping member and the pad 11A, are impregnated with a plurality of uniformly and closely spaced metal fragments 37 for the purposes set forth above.

In operation, the shoe 10, for example, is attached to the hoof 13 of the horse by driving nails 28 through the openings 27 in a substantially conventional manner. While the rubber (natural or synthetic) in the shoe is resiliently flexible, its tensile strength and rigidity are sufficient to prevent looseness, and the tapered upwardly converging shape of the openings 27 (FIG. 2) is such that the shoes are held firmly in place. After the shoe is mounted on the horse's hoof, the trim edge 18 is removed by a sharp instrument or by abrading procedures, whereby the gripping member 17 will be closely adjacent the edge of the hoof. However, where the horse's hoof is slightly oversize from a selected predetermined dimension, it may be unnecessary to remove much of the trim edge 18 so that the gripping member 17 will be spaced slightly inwardly from the edge of the horse's hoof, but this will create no problem.

Due to the resiliently flexible nature of the horseshoe of the invention, it absorbs substantially all of the severe shocks normally transmitted to the horse's hoof by typical, conventional metallic or unyielding plastic horseshoes. Also, the rubber horseshoes will be much less likely to slip on wet surfaces or on hard surfaces, such as concrete, stone, ice, frozen turf, frozen dirt or the like. Moreover, the small metallic fragments in the rubber will tend to provide some gripping effect as the rubber surrounding said fragments tends to recede with impact or wear.

It will be understood that the rubber mentioned herein could be either natural or synthetic, provided that the synthetic rubber has the resiliently flexible or elastomeric characteristics of the natural rubber.

Although particular preferred embodiments of the invention have been disclosed herein for illustrative purposes, it will be understood that variations or modifications of such disclosures, which come within the scope of the appended claims, are fully contemplated.

The embodiments of the invention in which an exclusive property or privilege is claimed are defined as follows:

1. A resiliently flexible horseshoe comprising:
   rubber sheet means having a peripheral configuration corresponding to, but slightly larger than, the peripheral configuration of the sole of a horse's hoof, said sheet means having a central opening and
   an arcuate rubber gripping member having a relatively wide and thin cross section and extending along, but spaced from, the edge thereof at least three-quarters around said sheet means and being spaced from the opening therein, the radially outer edge of said member being of a size substantially conforming to the outside contour of said hoof adjacent said sole; and
   a plurality of relatively small metallic fragments distributed substantially uniformly throughout said gripping member.

2. A structure according to claim 1, wherein said gripping member has heel caulks adjacent the ends thereof.

3. A structure according to claim 1, wherein said member has a swedge extending along a substantial portion thereof approximately midway between the lateral edges thereof.

4. A structure according to claim 1, wherein said member has a full swedge extending substantially the full length of said gripping member midway between the lateral edges thereof.

5. A structure according to claim 1, wherein the surface of said gripping member facing away from said sheet means is convex transversely of the lengthwise extent of the member.

6. A structure according to claim 1, wherein the lateral edge of said sheet means and said gripping member midway between the ends of said gripping member is straight.

7. A structure according to claim 1, wherein said metallic fragments are distributed closely and uniformly throughout said sheet means, and said gripping member is relatively stiff.

References Cited

UNITED STATES PATENTS

| 503,848 | 8/1893 | Hallanan | 168—4 |
| 562,302 | 6/1896 | Juillard | 168—14 |
| 924,790 | 6/1909 | Kane | 168—14 |

ALDRICH F. MEDBERY, Examiner

U.S. Cl. X.R.

168—14